United States Patent
Sunderrajan (10) Patent No.: US 10,693,706 B2
(45) Date of Patent: *Jun. 23, 2020

(54) METHOD AND APPARATUS OF PERFORMING SIMULTANEOUS MULTI-AGENT ACCESS FOR COMMAND EXECUTION THROUGH A SINGLE CLIENT

(71) Applicant: KASEYA LIMITED, Dublin (IE)

(72) Inventor: Santhoshkumar Sunderrajan, Goleta, CA (US)

(73) Assignee: KASEYA LIMITED, Dublin (IE)

( * ) Notice: Subject to any disclaimer, the term of this patent is extended or adjusted under 35 U.S.C. 154(b) by 78 days.

This patent is subject to a terminal disclaimer.

(21) Appl. No.: 15/955,083

(22) Filed: Apr. 17, 2018

(65) Prior Publication Data

US 2018/0234287 A1    Aug. 16, 2018

Related U.S. Application Data (63) Continuation of application No. 15/445,678, filed on Feb. 28, 2017, now Pat. No. 9,948,500, which is a continuation of application No. 14/924,123, filed on Oct. 27, 2015, now Pat. No. 9,590,841, which is a continuation of application No. 14/188,280, filed on Feb. 24, 2014, now Pat. No. 9,172,757, which is a continuation of application No. 13/311,659, filed on Dec. 6, 2011, now Pat. No. 8,676,954.

(51) Int. Cl.
*G06F 15/16* (2006.01)
*H04L 12/24* (2006.01)
*H04L 29/08* (2006.01)
*H04L 29/06* (2006.01)

(52) U.S. Cl.
CPC .......... *H04L 41/046* (2013.01); *H04L 67/125* (2013.01); *H04L 67/14* (2013.01); *H04L 67/141* (2013.01); *H04L 67/146* (2013.01); *H04L 67/42* (2013.01)

(58) Field of Classification Search
USPC ........ 709/202, 223, 229, 238, 225, 203, 227
See application file for complete search history.

(56) References Cited

U.S. PATENT DOCUMENTS

| | | | |
|---|---|---|---|
| 6,377,571 B1 | 4/2002 | Tai | |
| 6,684,256 B1 | 1/2004 | Warrier et al. | |
| 6,848,003 B1 | 1/2005 | Arimilli et al. | |
| 7,031,441 B1 | 4/2006 | Edwards et al. | |
| 7,130,629 B1 * | 10/2006 | Leung | H04W 80/04 455/435.1 |
| 7,130,910 B2 | 10/2006 | Urien | |
| 7,532,618 B1 | 5/2009 | Saurabh et al. | |
| 7,548,981 B1 * | 6/2009 | Taylor | H04L 63/0861 709/227 |

(Continued)

*Primary Examiner* — Jude Jean Gilles (57) ABSTRACT

One example procedure of managing agents via a session client may include selecting multiple endpoint devices to manage, establishing a connection to a server, and identifying at least two agent identifiers identifying multiple agents corresponding to the multiple endpoint devices. The procedure may also include transmitting a session setup command to the server including the at least two agent identifiers and receiving a confirmation that a session has been established between the session client and the multiple agents of the multiple endpoint devices.

20 Claims, 7 Drawing Sheets

(56) References Cited

U.S. PATENT DOCUMENTS

| | | |
|---|---|---|
| 7,751,536 B1 | 7/2010 | Abramson et al. |
| 8,006,089 B2* | 8/2011 | Ohba .................... H04W 12/06 |
| | | 713/168 |
| 8,046,829 B2* | 10/2011 | Oba ........................ H04L 63/08 |
| | | 726/14 |
| 8,116,286 B2* | 2/2012 | Sylvain ............. H04L 29/06027 |
| | | 370/338 |
| 8,385,285 B2 | 2/2013 | Haddad |
| 8,391,138 B2* | 3/2013 | Balasaygun .......... H04L 67/142 |
| | | 370/229 |
| 8,676,954 B2* | 3/2014 | Sunderrajan .......... H04L 67/141 |
| | | 709/223 |
| 9,172,757 B2* | 10/2015 | Sunderrajan .......... H04L 67/141 |
| 9,590,841 B2* | 3/2017 | Sunderrajan .......... H04L 67/141 |
| 9,948,500 B2* | 4/2018 | Sunderrajan .......... H04L 67/141 |
| 2002/0054588 A1 | 5/2002 | Mehta et al. |
| 2004/0037315 A1* | 2/2004 | Delautre ............... G06F 9/4862 |
| | | 370/466 |
| 2004/0044738 A1 | 3/2004 | Ohno et al. |
| 2004/0085969 A1 | 5/2004 | Chen et al. |
| 2004/0260824 A1 | 12/2004 | Berard et al. |
| 2006/0007900 A1* | 1/2006 | Sylvain ............. H04L 29/06027 |
| | | 370/338 |
| 2006/0265506 A1 | 11/2006 | Merkh et al. |
| 2006/0274688 A1 | 12/2006 | Maxwell et al. |
| 2007/0208586 A1 | 9/2007 | Urien |
| 2008/0163352 A1 | 7/2008 | Boudou et al. |
| 2009/0175438 A1 | 7/2009 | Stubbe-Ostergaard |
| 2009/0201855 A1 | 8/2009 | Weniger et al. |
| 2009/0296642 A1 | 12/2009 | Keller et al. |
| 2010/0082828 A1 | 4/2010 | Jennings et al. |
| 2010/0299191 A1 | 11/2010 | Gutierrez |
| 2011/0023086 A1 | 1/2011 | Goldman et al. |
| 2011/0110294 A1 | 5/2011 | Valluri et al. |
| 2011/0122832 A1 | 5/2011 | Haddad |
| 2011/0264811 A1 | 10/2011 | Arima et al. |
| 2011/0276699 A1 | 11/2011 | Pedersen |
| 2012/0331066 A1 | 12/2012 | FitzGerald |
| 2013/0145005 A1 | 6/2013 | Sunderrajan |

* cited by examiner

```
Microsoft Windows XP [Version 5.1.2600]
(C) Copyright 1985-2001 Microsoft Corp.

C:\WINDOWS\system32>hostname
     hostname
     agent-1

C:\WINDOWS\system32>
```

```
Microsoft Windows XP [Version 5.1.2600]
(C) Copyright 1985-2001 Microsoft Corp.

C:\WINDOWS\system32>hostname
     hostname
     agent-2

C:\WINDOWS\system32>
```

```
Microsoft Windows XP [Version 5.1.2600]
(C) Copyright 1985-2001 Microsoft Corp.

C:\WINDOWS\system32>hostname
     hostname
     agent-3

C:\WINDOWS\system32>
```

```
Microsoft Windows XP [Version 5.1.2600]
(C) Copyright 1985-2001 Microsoft Corp.

C:\WINDOWS\system32>hostname
     hostname
     agent-4

C:\WINDOWS\system32>
```

```
Microsoft Windows XP [Version 5.1.2600]
(C) Copyright 1985-2001 Microsoft Corp.

C:\WINDOWS\system32>hostname
     hostname
     agent-5

C:\WINDOWS\system32>
```

```
Microsoft Windows XP [Version 5.1.2600]
(C) Copyright 1985-2001 Microsoft Corp.

C:\WINDOWS\system32>hostname
     hostname
     agent-6

C:\WINDOWS\system32>
```

METHOD AND APPARATUS OF PERFORMING SIMULTANEOUS MULTI-AGENT ACCESS FOR COMMAND EXECUTION THROUGH A SINGLE CLIENT

CROSS-REFERENCE TO RELATED APPLICATIONS

The instant application is a continuation of and claims priority from patent application Ser. No. 15/445,678, filed Feb. 28, 2017, entitled METHOD AND APPARATUS OF PERFORMING SIMULTANEOUS MULTI-AGENT ACCESS FOR COMMAND EXECUTION THROUGH A SINGLE CLIENT, issued U.S. Pat. No. 9,948,500, issued Apr. 17, 2018, which is a continuation of and claims priority from patent application Ser. No. 14/924,123, filed Oct. 27, 2015, entitled METHOD AND APPARATUS OF PERFORMING SIMULTANEOUS MULTI-AGENT ACCESS FOR COMMAND EXECUTION THROUGH A SINGLE CLIENT, issued U.S. Pat. No. 9,590,841, issued Mar. 7, 2017, which is a continuation of patent application Ser. No. 14/188,280, filed Feb. 24, 2014, entitled METHOD AND APPARATUS OF PERFORMING SIMULTANEOUS MULTI-AGENT ACCESS FOR COMMAND EXECUTION THROUGH A SINGLE CLIENT, issued U.S. Pat. No. 9,172,757, issued Oct. 27, 2015, which is a continuation of patent application Ser. No. 13/311,659, filed Dec. 6, 2011, entitled METHOD AND APPARATUS OF PERFORMING SIMULTANEOUS MULTI-AGENT ACCESS FOR COMMAND EXECUTION THROUGH A SINGLE CLIENT, issued U.S. Pat. No. 8,676,954, issued Mar. 18, 2014, the entire contents are incorporated by reference herein.

TECHNICAL FIELD OF THE INVENTION

This invention relates to a method and apparatus of performing simultaneous multi-agent access through a single client, and more particularly to providing access to multiple agents for different applications while utilizing a single client interface.

BACKGROUND OF THE INVENTION

Conventionally, an administrator performs administrative functions (i.e., network updates, maintenance, etc.) by establishing connections to one agent at a time to perform such functions. The communication session setup and teardown process across a data network may be used to establish a connection with a single agent to perform the administrative functions, such as execute commands remotely from an administrative client interface. It would be optimal to establish a single client session by the administrator and execute commands simultaneously with multiple agents from the single client session.

SUMMARY OF THE INVENTION

An example embodiment of the present invention may include a method of managing a plurality of agents via a session client. The method may include selecting at least two endpoint devices to manage. The method may also include establishing a connection to a server, identifying at least two agent identifiers identifying at least two agents corresponding to the at least two endpoint devices and transmitting a session setup command to the server comprising the at least two agent identifiers. The method may further include receiving a confirmation that a session has been established between the session client and the at least two agents of the at least two endpoint devices.

Another example embodiment of the present invention may include an apparatus configured to manage a plurality of agents via a session client. The apparatus may include a processor configured to select at least two endpoint devices to manage and establish a connection to a server. The processor may further be configured to identify at least two agent identifiers identifying at least two agents corresponding to the at least two endpoint devices. The apparatus may also include a transmitter configured to transmit a session setup command to the server comprising the at least two agent identifiers, and a receiver configured to receive a confirmation that a session has been established between the session client and the at least two agents of the at least two endpoint devices.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention provide a simultaneous multi-agent access interface for interactive command execution through a single client and/or client interface. The multi-agent access interface may provide the capability to access and/or connect to multiple agents for different applications and command execution purposes. The multi-agent access interface may display multiple agent interactions (i.e., agents 1-N) in unity on a single client window interface. Such a configuration provides the capability to reproduce/execute the same and/or different commands at any particular time on different agent machines across a network.

An administrator may operate an interactive session via a network computing device (i.e., computer, tablet, smartphone, server, etc.) that executes the same command with multiple agents at the same time for performing the same function. The administrator may access any machine operating on a computer network and login as an administrator with administrative privileges. The administrator may setup an administrative session via a session client installed on a managed network computer or accessed via a network server from the network computer.

Figure 1:
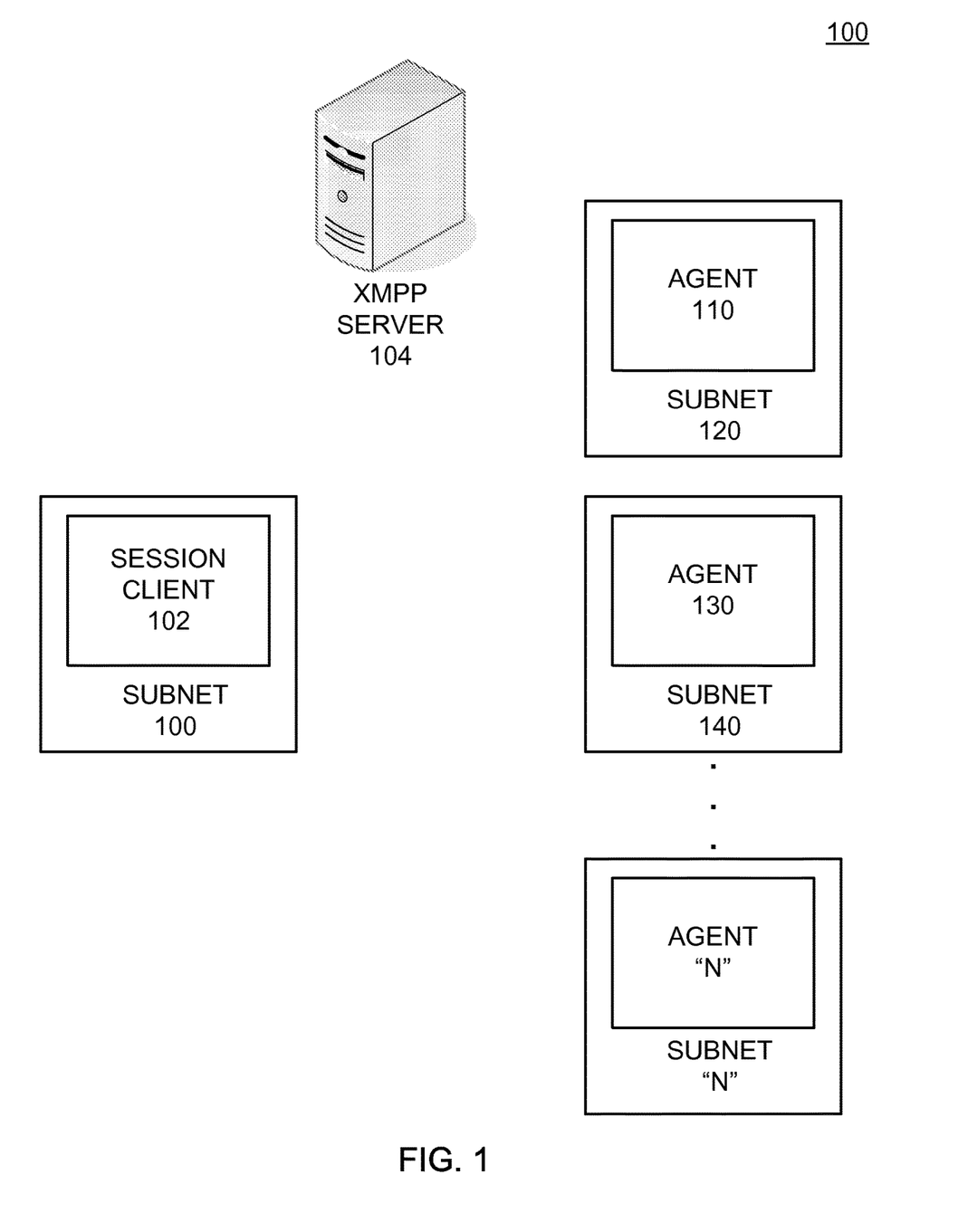
FIG. 1 illustrates an example network configuration according to example embodiments of the present invention.

FIG. 1 illustrates an example network configuration according to example embodiments of the present invention. Referring to FIG. 1, different subnetworks (subnets) may be part of the same network 100 and may include one or more client computers or endpoints that require administrative services via a remote session with an administrative session client. For example, subnet 120 may include one or more client computers accessible by one or more agent interfaces 110. Another agent 130 . . . N may be used to communicate with network devices on another subnet 140 . . . N. The session client 102 may be accessed by an administrator accessing a network computer device on a separate subnet 100. At the user interface, the administrator would select a list of agents and/or computer endpoints to connect with and select the corresponding agent names/icons to establish the connection. The administrator may be operating as a live agent or an automated application performing routine maintenance procedures.

Figure 2A:
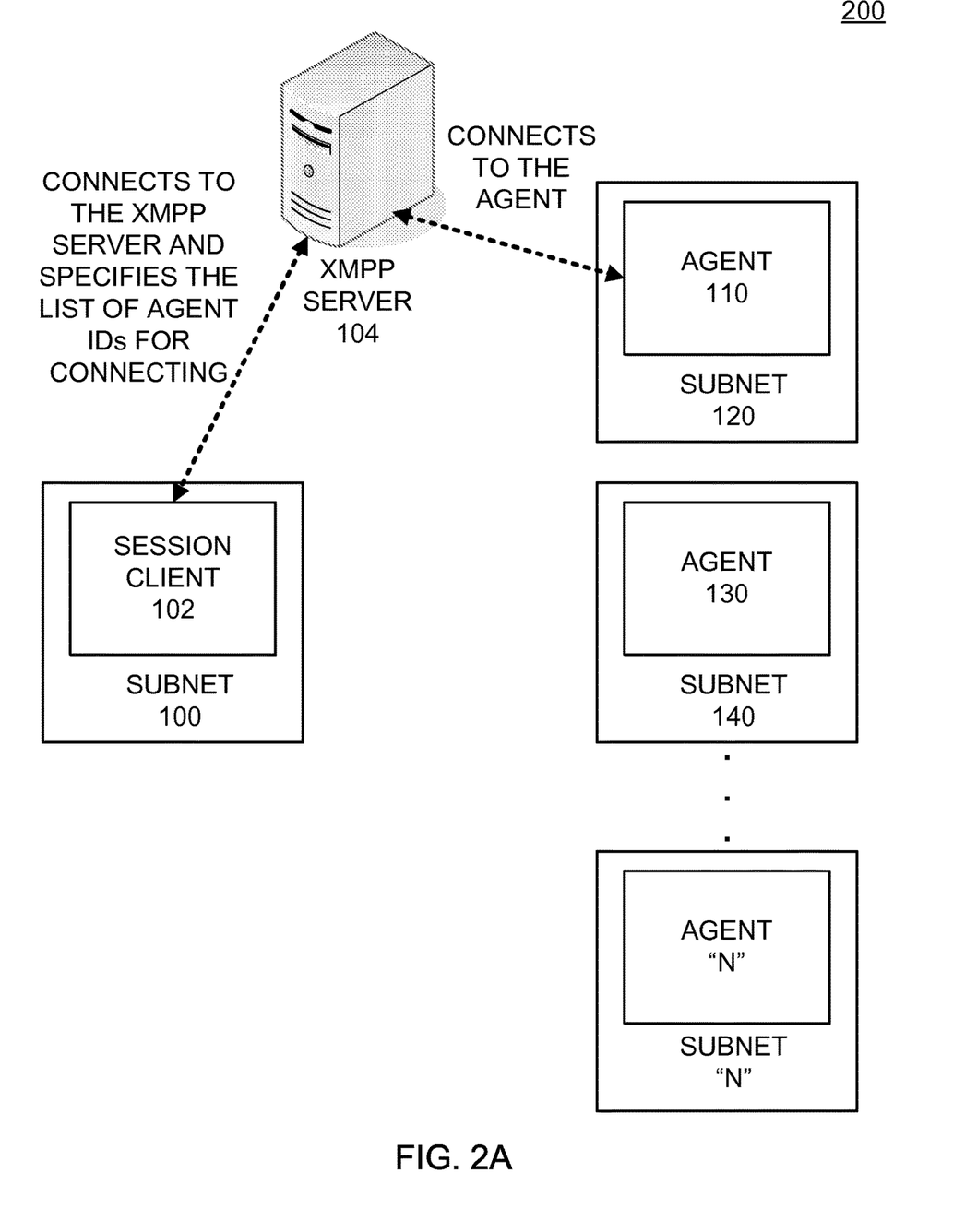
FIG. 2A illustrates an example network configuration with an initial session client session being established according to example embodiments of the present invention.

FIG. 2A illustrates an example network configuration 200 with an initial session client session being established according to example embodiments of the present invention. Referring to FIG. 2A, the session client 102 may have a pre-installed XMPP client that establishes a connection to a XMPP server 104 to exchange a list of agent identifiers (IDs), establish the connection with those agents, and execute corresponding administrative commands. The XMPP server 104 may check its internal agent roster list (i.e., presence list) and connect to the appropriate agents that require service or maintenance. Next, the XMPP server 104 may setup the connection stream between the session client 102 and the corresponding agent 110. A data stream is setup when both the session client 102 and the agent 110 can exchange information back and forth using XMPP stanzas described in detail below. The extensible messaging and presence protocol (XMPP) is an open technology used for real-time communications and related applications, such as instant messaging, presence, chat, voice calls, video calls, and routing of XML data.

Figure 2B:
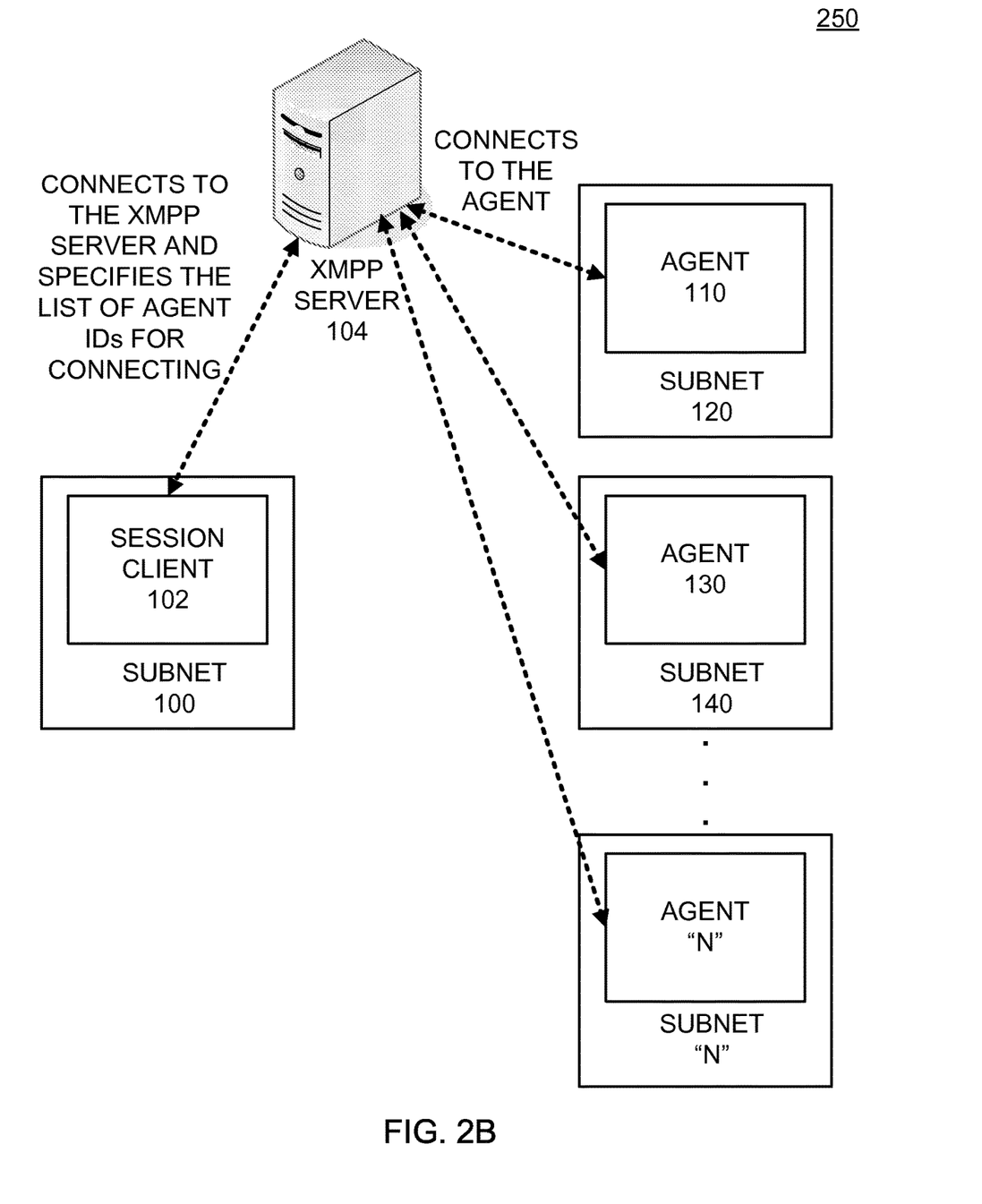
FIG. 2B illustrates an example network configuration with multiple agent sessions being established via a single client session according to example embodiments of the present invention.

FIG. 2B illustrates an example network configuration with multiple agent sessions being established via a single client session according to example embodiments of the present invention. Referring to FIG. 2B, a plurality of user agents are specified in a setup message transmitted by the client session 102 and communicated to the XMPP server 104. In this example, the client session 102 may be setup to deliver updates or other administrative functions to multiple user agents 110, 130 . . . "N", etc., across the network 250. There is no limit to the number of agents or corresponding subnets that may be accessed at any given time from a single client session 102. The initial session may be setup between the session client 102 and the XMPP server 104. Once the initial session is setup, the agent sessions may be setup to the various agents one at a time or simultaneously depending on the configuration of the XMPP server 104.

Figure 3A:
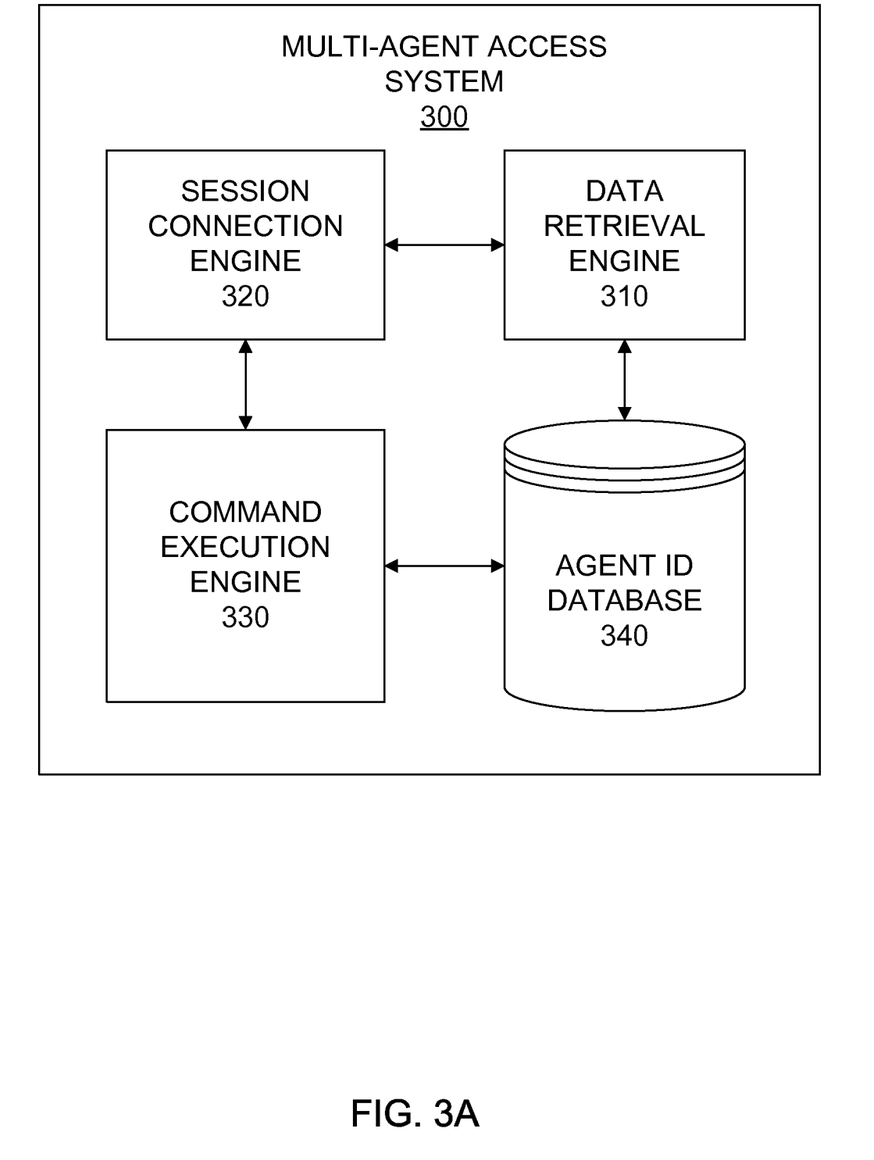
FIG. 3A illustrates an example multi-agent access system according to example embodiments of the present invention.

FIG. 3A illustrates an example multi-agent access system 300 according to example embodiments of the present invention. Referring to FIG. 3A, the access system may include multiple different processors and processing engines designated to provide a variety of different functions. The access system 300 may also include a local or remote memory and/or database used to store the data necessary to execute the various administrative functions and/or services.

In one example, the multi-agent access system 300 may perform a procedure for managing a plurality of agents via a session client. A data retrieval engine 310 may retrieve a list of agent identifiers stored in the agent ID database 340. The agent IDs may be stored in a data file or list and include corresponding endpoint identification information used to correlate the agent identifier to the endpoint device. The procedure may then select a plurality of endpoint devices to manage, and store their ID information in a memory cache for further processing.

A session connection engine 320 may then be used to establish a connection to a server (i.e., XMPP server) for establishing an initial connection over which commands may be transferred from the session client to the various agents. The session connection engine 320 may also be used to transmit a session setup command to the server comprising the agent identifiers. The system may receive a confirmation from the server that a session has been established between the session client and the various agents corresponding to the endpoint devices.

Once the session is established between the session client and the various agents, the command execution engine 330 may transmit a single command from the session client to the various agents of the corresponding endpoint devices. The single command may initiate any one or more of a software update, a maintenance procedure, and an administrative function to the various agents of the endpoint devices. As a result, a single command may be transmitted from the session client to multiple different agents simultaneously or contemporaneously.

Figure 3B:
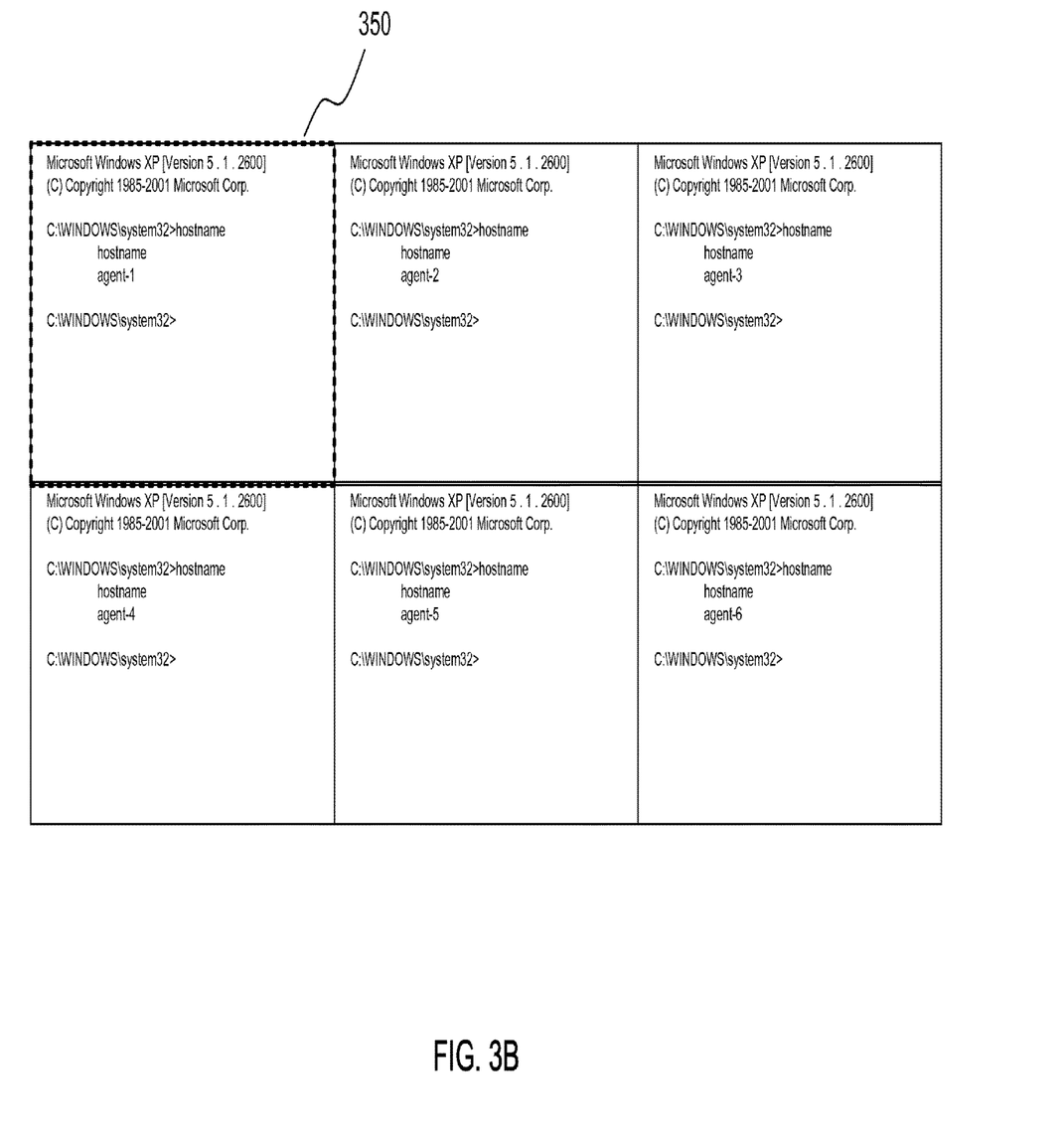
FIG. 3B illustrates an example user interface used to access one or more agents simultaneously.

FIG. 3B illustrates an example user interface used to access one or more agents simultaneously. Referring to FIG. 3B, a multi-agent command shell access interface is illustrated as having multiple agent sessions (e.g., agents 1-6) open and ready for access. The session client may initiate a series of different agent window prompts corresponding to a plurality of different agents. One agent may be managed at a time or may be the focus of the administrative functions being performed by the session client. The highlighted interface 350 is used to designate the agent that is currently being managed by the session client. Alternatively, the management efforts performed on one agent may be replicated to the other agents. For example, the command may be received once at a first command prompt user agent session and the command may be parsed, stored in a buffer and retrieved during the process of establishing multiple other command execution stanzas required to transmit the command to multiple other agents for execution.

The multi-agent command shell access interface may be used to remotely execute a command on the agent machines. For example, the administrator may enter the command(s) on one of the windows. For example, the command "hostname" may be entered into the user interface window 350. The session client may parse the command to identify and arrange the command in a multiple-agent stanza to be sent to all the connected agents.

An example XMPP stanza used to receive a command is shown below:

```
<iq from = "session-client@domain.org" to = "agent-1@domain.org"
xmlns = "http://domain.org/CommandShell" messageId = "1234646" >
   <CommandShell sessionID =" 1242" >
   <ExecuteCommand> "hostname"</ExecuteCommand>
   </CommandShell>
</iq>
<iq from = "session-client@domain.org" to = "agent-2@domain.org"
xmlns = "http://domain.org/CommandShell" messageId = "1234646" >
   CommandShell sessionID =" 1256" >
   <ExecuteCommand> "hostname"</ExecuteCommand>
   </CommandShell>
</iq>
```

The agent machine/endpoint may receive the command and execute it accordingly. The agent may then send back the reply with the <iq> response as shown below:

```
<iq from = "agent-2@domain.org" to = "session-client@domain.org"
xmlns = "http://domain.org/CommandShell" messageId = "1234646" >
   <CommandShell sessionID =" 1256" >
   <ExecuteCommandResponse> "agent-1"</ExecuteCommandResponse>
   </CommandShell>
</iq>
```

As a result of exchanging command information, the session client on the administrator side parses the response and displays it on the appropriate window.

The communication session(s) established between the session client 102 and the XMPP server 104 are setup first prior to communicating with any remote agents. An example of the signaling/messages used to establish the communication session between an agent or session client with the XMPP server 104 is provided below. A session client or agent (same for both) would send a stream header to the XMPP server:

```
<?xml version="1.0"?>
<stream:stream to="kaseya.com"
version="1.0"
xmlns="jabber:client"
xmlns:stream="http://etherx.jabber.org/streams">
```

In response, the XMPP server begins a response stream and replies back:

```
<?xml version="1.0"?>
<stream:stream from="kaseya.com"
id="k0d1m43rt53ht"
version="1.0"
xmlns="jabber:client" xmlns:stream="http://etherx.jabber.org/streams">
```

The XMPP server 104 may then send certain messages back and forth to arrive at an agreement with the agent. During the communication process the XMPP server authenticates the agent/session-client. The session client or agent would register itself with the XMPP server 104 and perform session binding by specifying the resource name, which is required for proper routing of the messages from the XMPP server 104, as shown below:

```
<iq id="b1h4r9rx" type="set">
   <bind xmlns="urn:ietf:params:xml:ns:xmpp-bind">
   <resource>LiveConnect"</resource> </bind>
   </iq>
```

As a result, the XMPP server 104 acknowledges the registration and binding and replies back. In this example, agent1 would be identified by the XMPP server 104 by "agent-1@kaseya.com/LiveConnect":

```
<iq id="b1h4r9rx" type="result">
   <bind xmlns="urn:ietf:params:xml:ns:xmpp-bind">
   <jid>agent-1@kaseya.com/LiveConnect</jid> </bind>
   </iq>
```

The session client 102 would maintain a connection to the XMPP server 104. When the administrator (user) may select a list of agents and starts a new session, the client would initiate a session with the XMPP server 104 and provide the agent addresses that it would like to connect. The XMPP server 104 identifies the agent or agents to connect with by maintaining a presence list of the currently connected agents. Agents in the list are identified by the name used while registering with the XMPP server 104. The format is agent-name@domain-name, for example, agent1@kaseya.com is a valid agent jabber ID. The XMPP server 104 may internally store this information in a database or in a structured file system. The agents are independent but may be setup simultaneously. During the active communication between the session client and a particular agent the agents and corresponding session client would be always connected to the XMPP server 104 for a proper routing of messages from the XMPP server 104 to the agent machine and to the appropriate process that is served for the session client.

The application message exchanges between the session client and agents would follow the stanza specification described below. For example:

```
<iq from = "session-client@kaseya.com/LiveConnect" to = "agent-
1@kaseya.com/LiveConnect" xmlns = "http://domain.org/CommandShell"
messageId = "1234646" >
<CommandShell sessionID ="1242">
<ExecuteCommand> ,hostname, </ExecuteCommand>
</CommandShell>
</iq>
<iq from = "agent-2@kaseya.com/LiveConnect" to = "session-
client@kaseya.com/LiveConnect" xmlns = " http://domain.org/
CommandShell" messageId = "1234646" >
<CommandShell sessionID ="1256" >
```

```
<ExecuteCommandResponse>"agent-1" </ExecuteCommandResponse>
</CommandShell>
</iq>
```

In the above example, stanza, the <ExecuteCommand> encloses the command from the session-client to be executed on the agent process. <ExecuteCommandResponse> would enclose the command response from the agent process to the session client. <ExecuteCommand> could enclose any command that user types on the client interface.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of the other figures.

Figure 4:
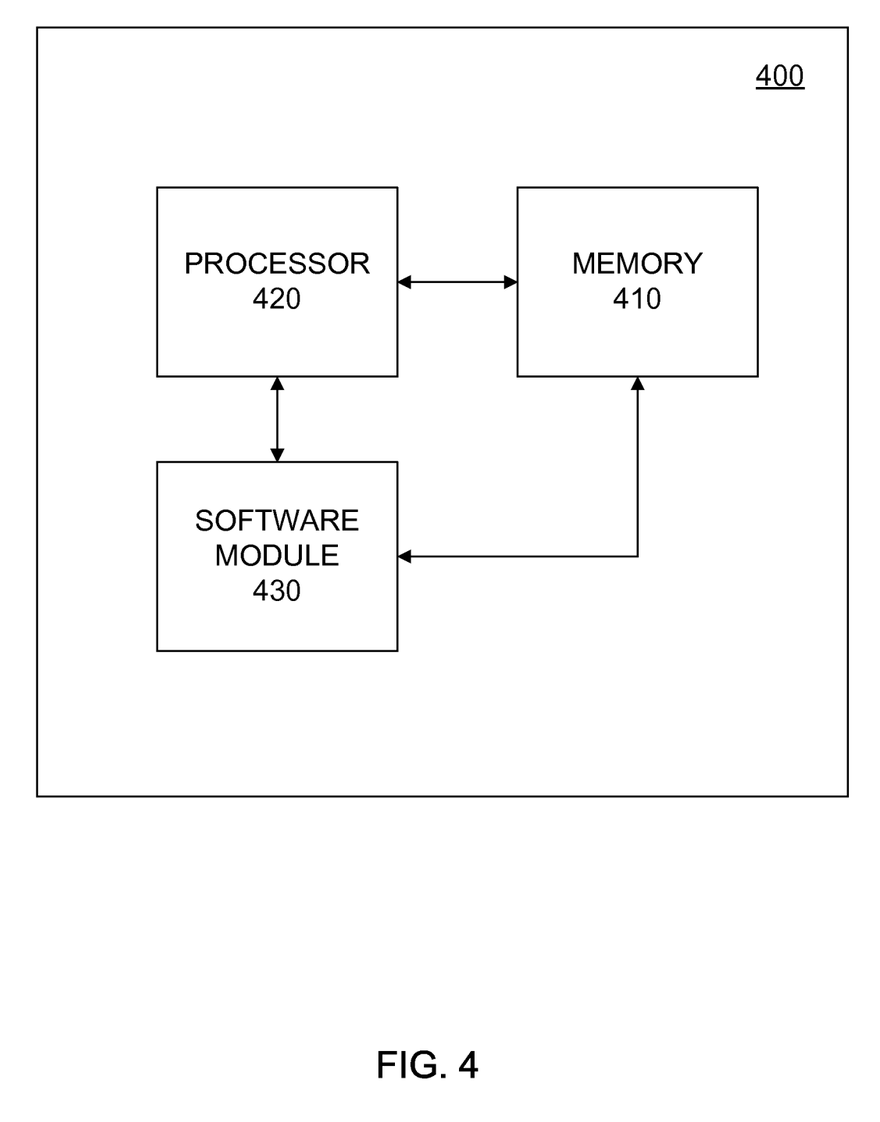
FIG. 4 illustrates an example network entity device configured to store instructions, software, and corresponding hardware for executing the same, according to example embodiments of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
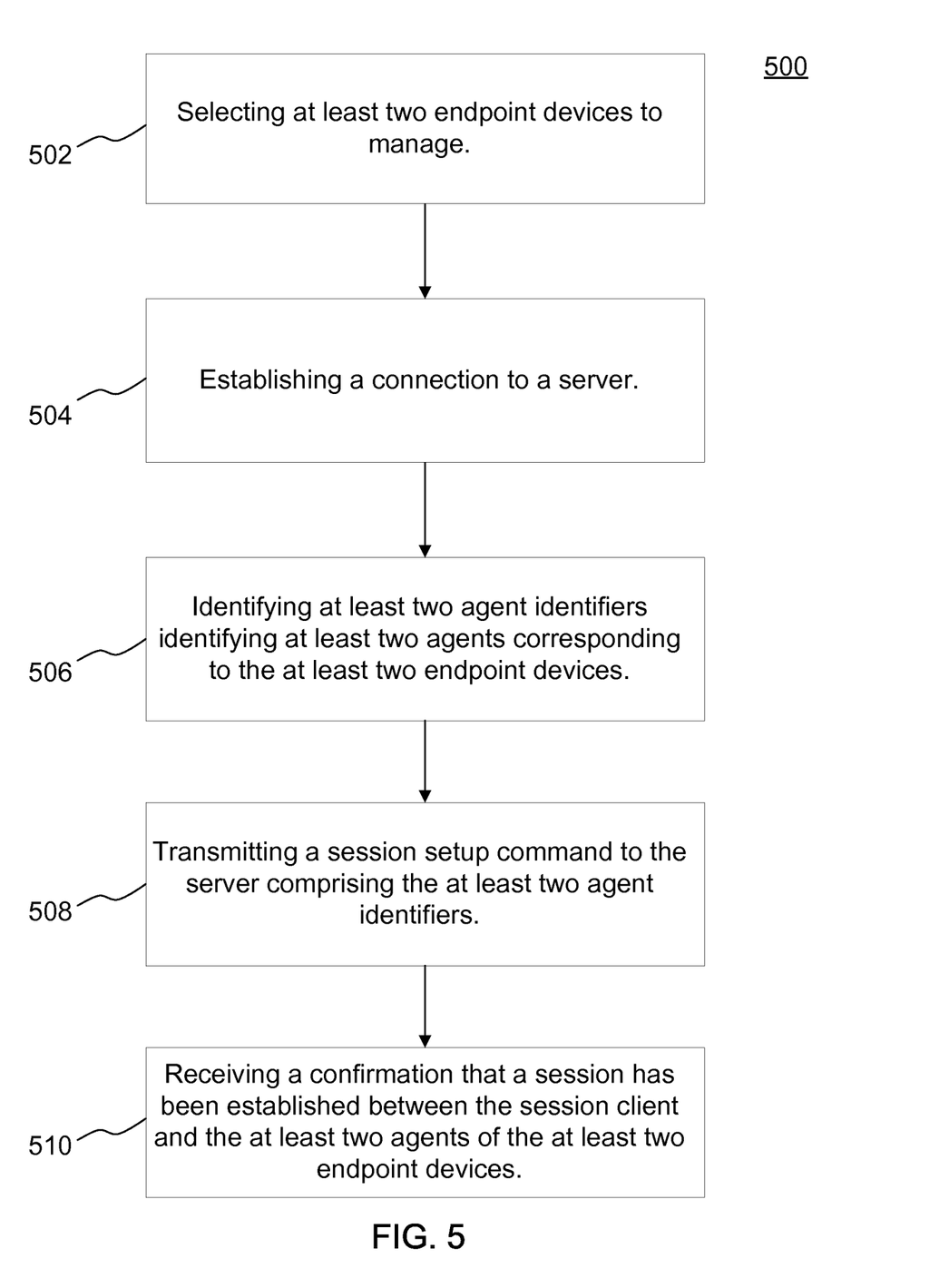
FIG. 5 illustrates an example method flow diagram, according to example embodiments of the present invention.

FIG. 5 illustrates an example method of operation according to example embodiments of the present invention. Referring to FIG. 5, a method of managing a plurality of agents via a single session client is disclosed. The method provides selecting at least two endpoint devices to manage at operation 502, establishing a connection to a server at operation 504 and identifying at least two agent identifiers identifying at least two agents corresponding to the at least two endpoint devices at operation 506. The method further includes transmitting a session setup command to the server comprising the at least two agent identifiers at operation 508 and receiving a confirmation that a session has been established between the session client and the at least two agents of the at least two endpoint devices at operation 510.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   establishing a connection to a server;
   identifying at least two agent identifiers identifying at least two agents corresponding to at least two endpoint devices to manage;
   establishing a session between a session client and the at least two endpoint devices; and
   transmitting a single command from the session client to the at least two agents of the at least two endpoint devices.

2. The method of claim 1, further comprising transmitting a session setup command to the server comprising the at least two agent identifiers.

3. The method of claim 1, wherein the single command initiates at least one of a software update, a maintenance procedure, and an administrative function to the at least two agents of the at least two endpoint devices.

4. The method of claim 1, further comprising parsing the single command prior to transmitting the single command from the session client to the at least two agents of the at least two endpoint devices.

5. The method of claim 1, further comprising receiving confirmation from at least one of the at least two agents that the single command has been executed by each of the at least two agents of the at least two endpoint devices.

6. The method of claim 1, further comprising:
   receiving the single command at a first command prompt of a first user agent session of the session client;
   parsing the single command; and
   storing the single command in a buffer.

7. The method of claim 6, further comprising:
   creating at least one stanza corresponding to the at least two agents;
   retrieving the stored single command from the buffer;
   replicating the single command for the at least two agents and;
   inserting the replicated single command into the at least one stanza prior to transmitting the single command to the at least two agents for execution.

8. An apparatus, comprising:
   a processor configured to
      establish a connection to a server;
      identify at least two agent identifiers that identify at least two agents that correspond to at least two endpoint devices to manage;
   a transmitter configured to transmit a single command from the session client to the at least two agents of the at least two endpoint devices; and
   a receiver configured to establish a session between a session client and the at least two endpoint devices.

9. The apparatus of claim 8, wherein the transmitter is further configured to transmit a session setup command to the server comprising the at least two agent identifiers.

10. The apparatus of claim 8, wherein the single command initiates at least one of a software update, a maintenance procedure, and an administrative function to the at least two agents of the at least two endpoint devices.

11. The apparatus of claim 8, wherein the processor is further configured to parse the single command prior to a transmission of the single command from the session client to the at least two agents of the at least two endpoint devices.

12. The apparatus of claim 8, wherein the receiver is further configured to receive confirmation from at least one of the at least two agents that the single command has been executed by each of the at least two agents of the at least two endpoint devices.

13. The apparatus of claim 8, wherein the receiver is further configured to receive the single command at a first command prompt of a first user agent session of the session client, and the processor is further configured to parse the single command and store the single command in a buffer.

14. The apparatus of claim 13, wherein the processor is further configured to create at least one stanza that correspond to the at least two agents, retrieve the stored single command from the buffer, replicate the single command for the at least two agents and, insert the replicated single command into the at least one stanza prior to a transmission of the single command to the at least two agents for execution.

15. A non-transitory computer readable storage medium configured to store instructions that when executed cause a processor to perform:
   establishing a connection to a server;
   identifying at least two agent identifiers identifying at least two agents corresponding to at least two endpoint devices to manage;
   transmitting a single command from the session client to the at least two agents of the at least two endpoint devices; and
   establishing a session between a session client and the at least two endpoint devices.

16. The non-transitory computer readable storage medium of claim 15, wherein the processor is further configured to perform transmitting a session setup command to the server comprising the at least two agent identifiers.

17. The non-transitory computer readable storage medium of claim 15, wherein the single command initiates at least one of a software update, a maintenance procedure, and an administrative function to the at least two agents of the at least two endpoint devices.

18. The non-transitory computer readable storage medium of claim 15, wherein the processor is further configured to perform parsing the single command prior to transmitting the single command from the session client to the at least two agents of the at least two endpoint devices.

19. The non-transitory computer readable storage medium of claim 15, wherein the processor is further configured to perform receiving confirmation from at least one of the at least two agents that the single command has been executed by each of the at least two agents of the at least two endpoint devices.

20. The non-transitory computer readable storage medium of claim 15, wherein the processor is further configured to perform:
   receiving the single command at a first command prompt of a first user agent session of the session client;
   parsing the single command;
   storing the single command in a buffer;
   creating at least one stanza corresponding to the at least two agents;
   retrieving the stored single command from the buffer;
   replicating the single command for the at least two agents and;
   inserting the replicated single command into the at least one stanza prior to transmitting the single command to the at least two agents for execution.

* * * * *